United States Patent [19]

Oyama

[11] Patent Number: 5,325,308
[45] Date of Patent: Jun. 28, 1994

[54] SIMULATION METHOD OF MACHINING STEPS

[75] Inventor: Hiroshi Oyama, Niwa, Japan
[73] Assignee: Okuma Corporation, Nagoya, Japan
[21] Appl. No.: 916,745
[22] Filed: Jul. 22, 1992

[30] Foreign Application Priority Data

Jul. 25, 1991 [JP] Japan ................................ 3-208687

[51] Int. Cl.⁵ ............................................. G06F 15/46
[52] U.S. Cl. ........................ 364/474.26; 364/474.24; 364/578
[58] Field of Search .................. 364/474.24, 474.26, 364/468, 188–193, 578; 340/723

[56] References Cited

U.S. PATENT DOCUMENTS

| | | | |
|---|---|---|---|
| 4,879,667 | 11/1989 | Gorski et al. | 364/474.24 |
| 4,953,094 | 8/1990 | Letcher, Jr. | 364/474.24 |
| 4,956,787 | 9/1990 | Ito et al. | 364/474.24 |
| 5,150,305 | 9/1992 | Sekikawa | 364/474.24 |
| 5,175,688 | 12/1992 | Sasaki et al. | 364/474.26 |

Primary Examiner—Jerry Smith
Assistant Examiner—Thomas E. Brown
Attorney, Agent, or Firm—Wenderoth, Lind & Ponack

[57] ABSTRACT

A method for simulating machining reduces the memory capacity to store blank shape and tool shape by representing such a blank or tool shape only in terms of distances from a visual plane. This method enables a relatively low priced processing system to display detailed shapes graphically as even if the shape of a blank is changed by machining; the system only judges the relative magnitude of the distances in each segment. This method enables detailed machining simulation of cubic shapes by a relatively low priced processing system and with a smaller memory capacity.

3 Claims, 11 Drawing Sheets

2 VIEWING PLANE

SIMULATION METHOD OF MACHINING STEPS

BACKGROUND OF THE INVENTION

1. Field of the Invention

This invention relates to a method of simulating machining steps which is used to confirm NC (numerical control) programs. More particularly, this invention relates to a method of simulating the machining steps which are suitable for machining arbitrary cubic shapes.

2. Prior Art

A previous method of simulating machining steps graphically displays in animation on a display unit the process of machining a blank by tools and machines. Such a method can quickly and easily confirm the desirability of the machining sequence and can detect errors, if any, in an NC program before the machining is actually conducted, and can prevent defects in the machining or the collision of the machines, eliminate the necessity of idling, and improve the operational efficiency of the machines.

Machining simulation systems have been proposed which simulate a machining process by displaying in projections or sections a blank in the process of having its shape changed as the tool is moved. According to one such method, a three-dimensional space is divided into a given number of segments; a determination as to whether or not each segment has been filled by the blank is stored in a memory, and images are displayed in accordance with the stored data. However, this method is defective in that if the size of one segment is reduced, the memory capacity required for the data storage increases enormously and the processing for the change of the shape also becomes extensive such that an inexpensive processing system could not deal with them smoothly. Conversely, if the size of one segment is increased, the memory capacity for storing the blank shapes as well as the number of image processing steps may be reduced, but the images on display become so crude that details of the machining steps for the blank shape could not be understood.

As stated above, none of the prior art simulation methods for a machining center could provide a detailed display of how a blank is machined. Particularly, in the case of the simulated machining of a cubic shape, the amount of information to be stored generally becomes enormous, requiring an expensive system. In order to overcome the defects, there have been proposed methods to reduce the amount of information and processing needed. For instance, an X-Y plane is divided into grids and the height of a blank in the direction of a Z-axis at each point is stored in a memory. However, this method is defective in that as the expressing mode for the blank shapes in simulation differs from that for display, every time the blank is cut in the expressing mode for the simulation, it must be converted to the display mode. Further, it is defective in that if the blank has a cavity in the direction of the Z-axis, the method cannot express such a cavity.

SUMMARY OF THE INVENTION

This invention was conceived to overcome aforementioned defects encountered in the prior art and aims to provide a machining simulation method which can display animated images with a relatively small memory capacity using a relatively inexpensive processing system.

According to one aspect of this invention, for achieving the objects described above, there is provided a machining simulation method by displaying in animation the states of machining a blank by a tool, which comprises the steps of segmenting a viewing plane on which the blank shape is projected into segments of a given size, preparing a blank shape matrix which stores, for each of said segments, the distances between visible surfaces of said blank and said viewing plane in terms of many-values and a tool shape matrix which stores the distances between the visible surfaces of said tool and said viewing plane for each of said segments in terms of many-values, forming a blank segment list of each of the segments for the invisible surfaces of said blank hidden by said visible surfaces by using the distances from said viewing plane as elements and using said blank shape matrix as the top or the first element so as to identify whether said blank fills the space between the elements of said blank segment list, forming a tool segment list of each of the segments for the invisible surfaces of said tool hidden by said visible surfaces by using the distances from said viewing plane as elements and using said tool shape matrix as the top or the first element so as to identify whether said tool fills the space between the elements of said tool segment list, revising said blank segment list so as to make the scope in which said blank segment list, thereby revising a displayed shape of a blank being machined after each simulated pass of the tool and said tool segment list of the same segment overlap empty, revising said blank segment list by changing the distances from said viewing plane stored by each element of said tool segment list and changing the correspondence in each segment between said blank segment list and said tool segment list, and repeating the steps of revising the blank segment list.

The nature, principle and utility of the invention will become more apparent from the following detailed description when read in conjunction with the accompanying drawings.

DESCRIPTION OF THE PREFERRED EMBODIMENT

One embodiment of this invention will now be described referring to the attached drawings.

Figure 1:
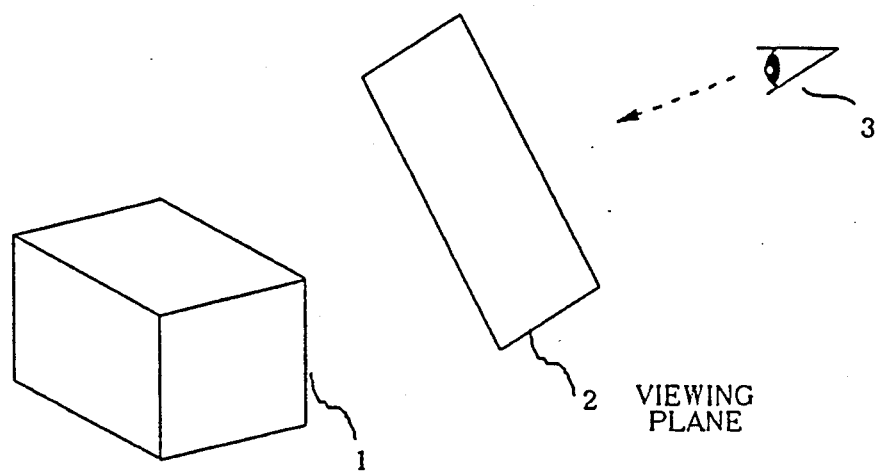
FIG. 1 is a view showing a concept of the machining simulation method according to this invention.
Figure 2:
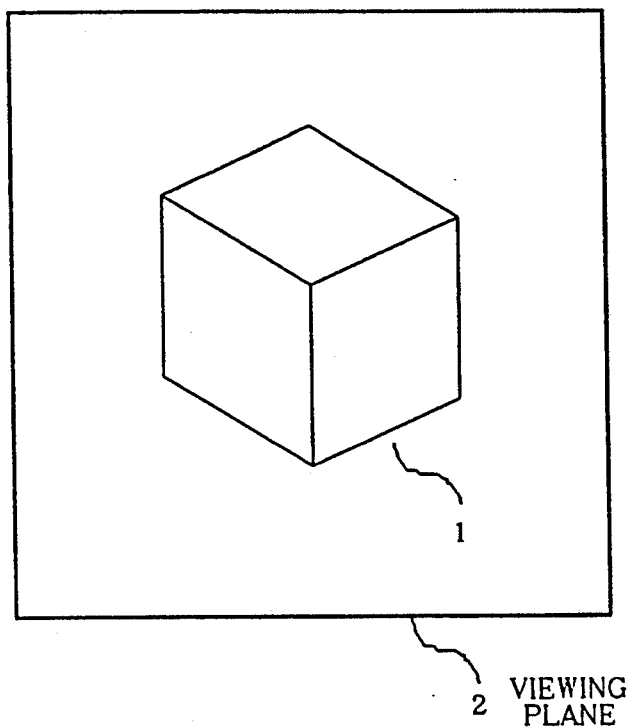
FIG. 2 is a view showing an image of the blank shape projected on the viewing plane when viewed from the viewpoint in FIG. 1.
Figure 3:
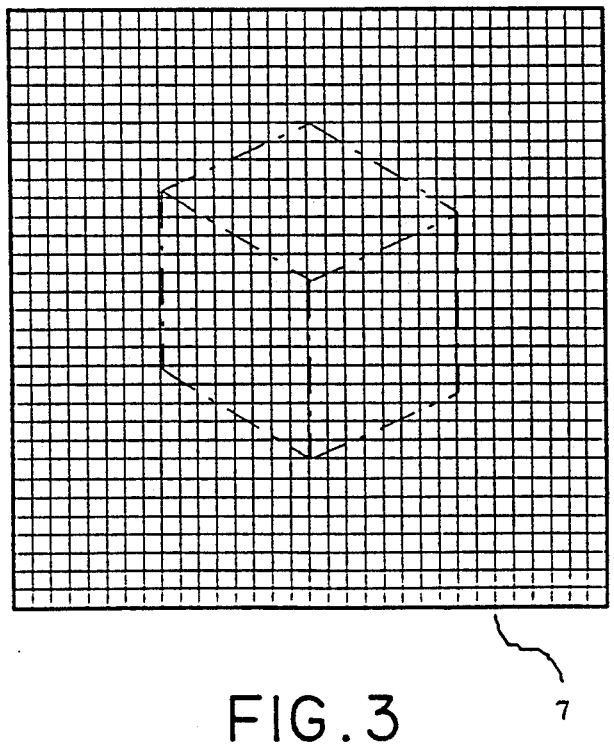
FIG. 3 is a view showing a concept of the machining simulation method according to this invention.
Figure 4:
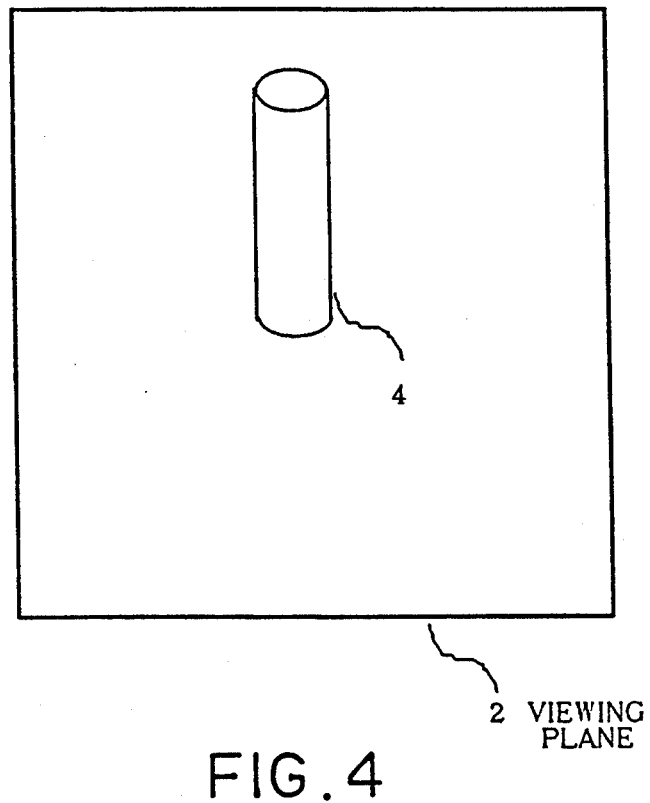
FIG. 4 is a view showing an example of an image of a tool shape projected on the viewing plane.
Figure 5:
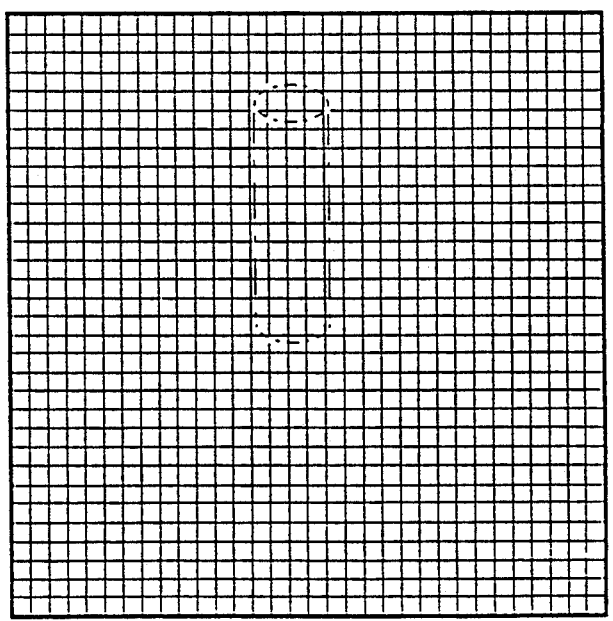
FIG. 5 is a view showing a tool shape matrix prepared by segmenting the viewing plane into a given size.

FIGS. 1 through 7 are views illustrating the concept of the machining simulation method according to this invention. FIG. 2 shows an image of a blank 1 projected in a viewing plane 2 when viewed from the viewing point 3 in FIG. 1. FIG. 3 shows a blank shape matrix 7 prepared by dividing the viewing plane of FIG. 2 into segments of a given size. The shape expressed by a one-dot-chain line is the one obtained by projecting the blank 1 onto the viewing plane 2. The distance between the blank 1 and the viewing plane 2 is retained in terms of values in segment of the blank shape matrix 7. FIG. 4 shows an image of a tool 4 on the viewing plane 2. FIG. 5 shows a tool shape matrix 5 prepared by dividing the viewing plane 2 of FIG. 4 into segments of a given size. The shape expressed by a one-dot-chain line in FIG. 5 is the image of a tool 4 projected in the viewing plane 2. Each segment of the tool shape matrix 5 retains the distance of the tool 4 from the viewing plane 2 in terms of values similar to the blank shape matrix 7.

Figure 6:
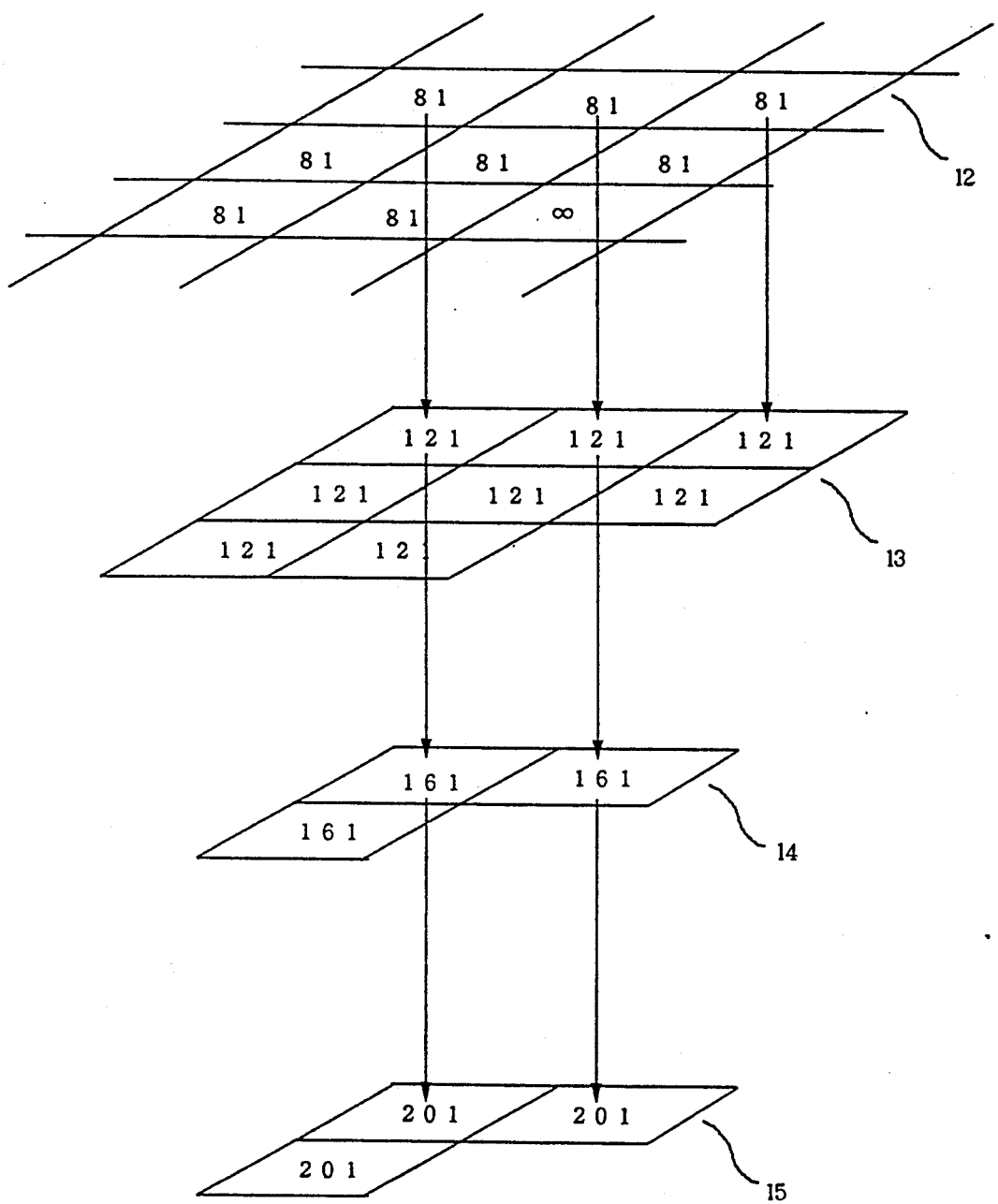
FIG. 6 is a view for explaining the method for preparing the blank segment list of this invention.
Figure 7:
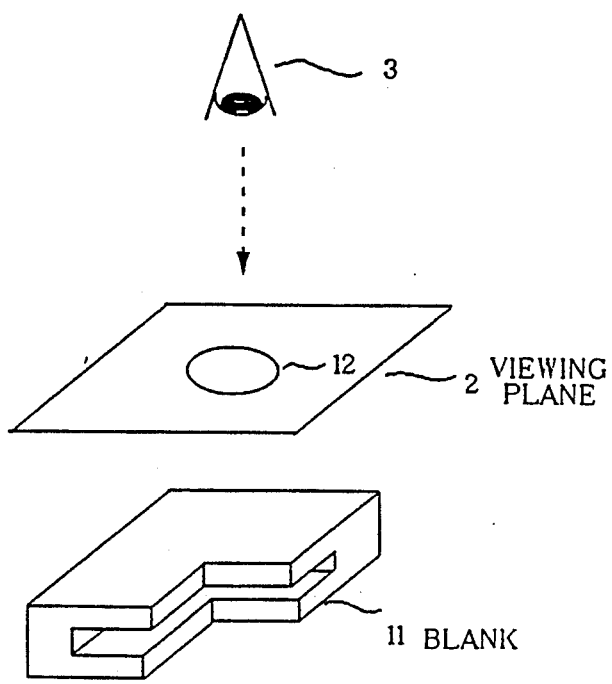
FIG. 7 is a view for explaining the method for preparing the tool segment list according to this invention.

FIGS. 6 and 7 are views for explaining the method of preparing a blank segment list and a tool segment list. A part 12 on the blank shape matrix shown in FIG. 6 is the part of the blank shape matrix prepared by projecting the blank 11 shown in FIG. 7 on the viewing plane 2 when viewed from the viewing point 3. The reference numerals 13 through 15 in FIG. 6 denote pieces of the blank segment list prepared using each segment of the blank shape matrix 12 as the top or first element, and the numerals written in each segment of the blank shape matrixes 12 through 15 show the distance from the viewing plane 2 to the surface of the blank 11. The distance from the viewing plane 2 to the surface of the blank 11 can be calculated by a coordinate transformation with matrix if the coordinates of the blank 11 are known. The symbol "∞" denotes a part where the blank 11 does not exist. As the numeral 13 of FIG. 6 denotes the second element in the list, the numeral 14 the third element of the list, and likewise, the numerals express the elements in the vertical order. The second element and those thereafter of the blank segment list are prepared using as the value the distance from the viewing point 3 to the invisible surface of the blank 11 which is not visible as it is shielded by the visible plane. The 2n-th (n=an integer) elements of the list are the surfaces facing the viewing point 3 while the (2n−1)-th elements of the list are the surfaces facing the direction opposite the viewing point 3. In other words, the blank fills the space between a 2n-th element and a (2n−1)-th element while there is an empty space between the (2n−1)-th element and a 2n-th element. The tool segment list may be made similarly to the blank segment list, but in addition to the information on the distance from the viewing plane 2 to the surface of the tool 4, the elements of the list should store respectively the information whether the surface is a part of the cutting blade or not.

Figure 8A:
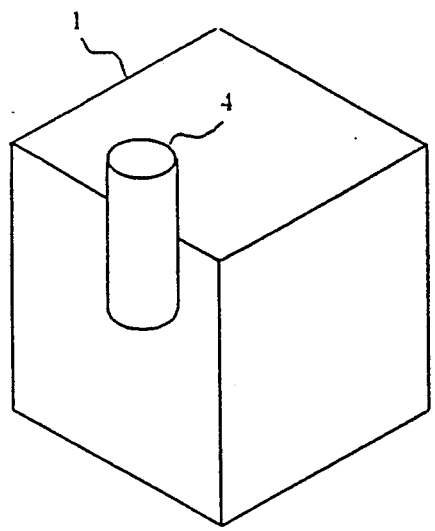
FIGS. 8A to 8E are views showing examples of images on the display screen of the machining simulation system according to this invention.
Figure 8B:
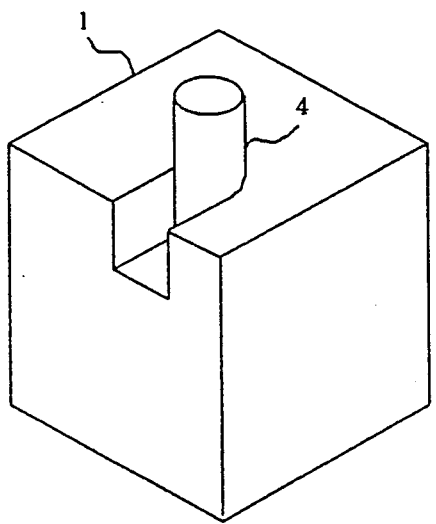
Figure 8C:
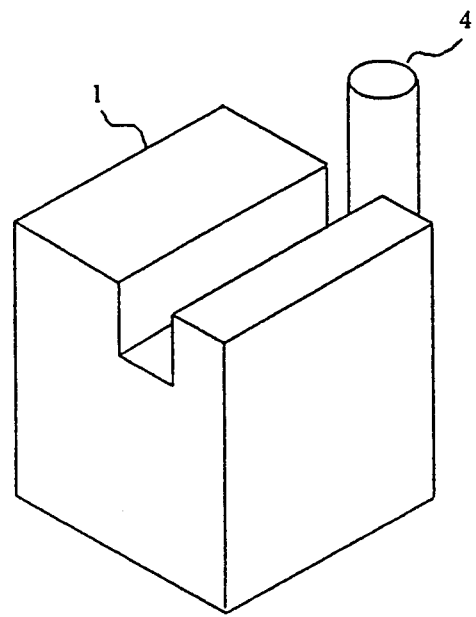
Figure 8D:
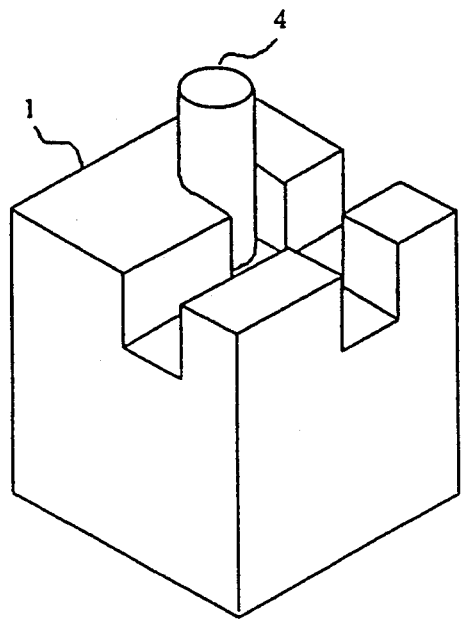

FIGS. 8A to 8E show examples of a display screen of the first embodiment of the machining simulation system according to this invention. FIG. 8A shows a state where the tool 4 stays in front of the blank 1, FIG. 8B a state where the tool 4 has cut into the blank 1 from a side surface thereof, FIG. 8C a state where the tool 4 exists beyond the blank 1 and FIG. 8D a state where the tool 4 has cut into the blank 1 from another side surface. When displaying the above, the display should be made according to the values of whichever closer to the viewing plane 2 from either the blank shape matrix or the tool shape matrix.

Figure 9:
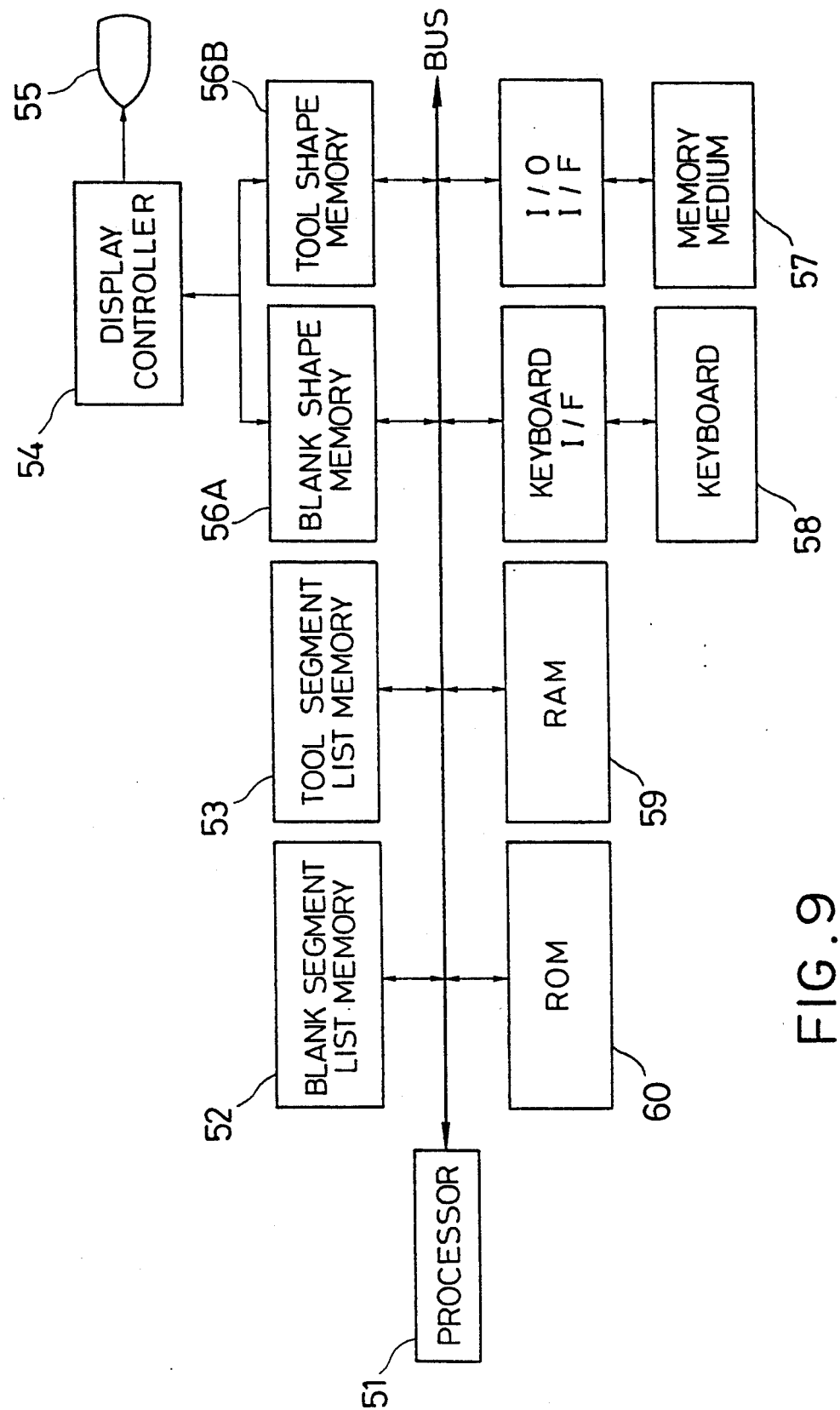
FIG. 9 is a block diagram of a machining simulation system to realize this invention method.

FIG. 9 is a block diagram of the structure of the hardware of the machining simulation system which realizes this invention method. In the diagram, a processor 51 interprets the machining program stored in an RAM 59 in accordance with the control program stored in a ROM 60 and performs the processing steps (to be described later) shown in the flow charts in FIG. 10 and FIGS. 11A and 11B. A blank segment list memory 52 and a tool segment list memory 53 respective store elements of the second elements and thereafter of the blank segment list and of the tool segment list. The are memories like the RAM 59 in which data can be written in. A keyboard 58 and a memory medium 57 are used for inputting the blank data and the tool data through a keyboard interface and an I/O interface respectively. A blank shape memory 56A stores the blank shape matrix, and a tool shape memory 56B stores the tool shape matrix. A display controller 54 displays an image on a display unit 55, such as CRT, based on the values in the memories 56A and 56B. Although only one processor is provided in this embodiment, a plural number of processors may be used in a multi-processor system.

Figure 8E:
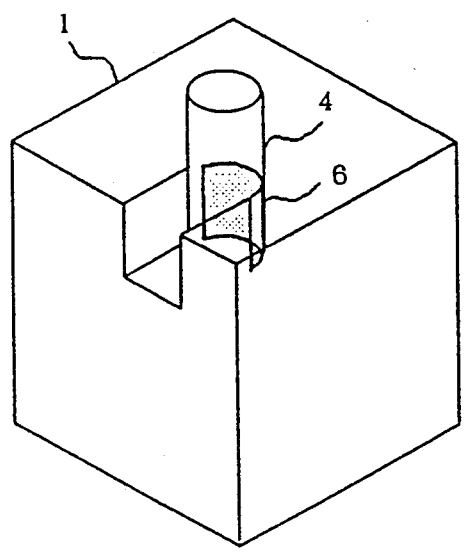
Figure 10:
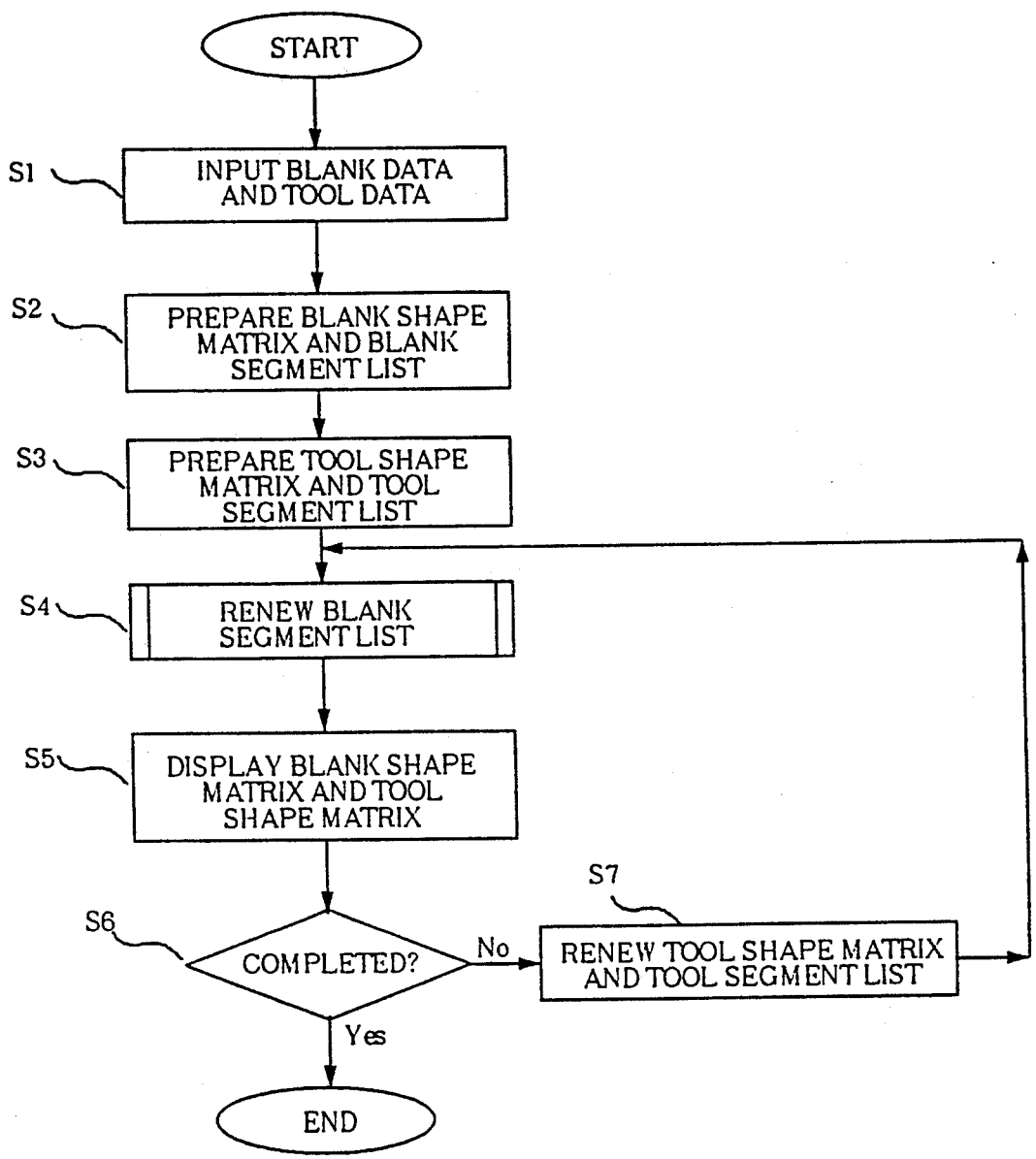
FIG. 10 is a flowchart of an example of the machining simulation method.
Figure 11A:
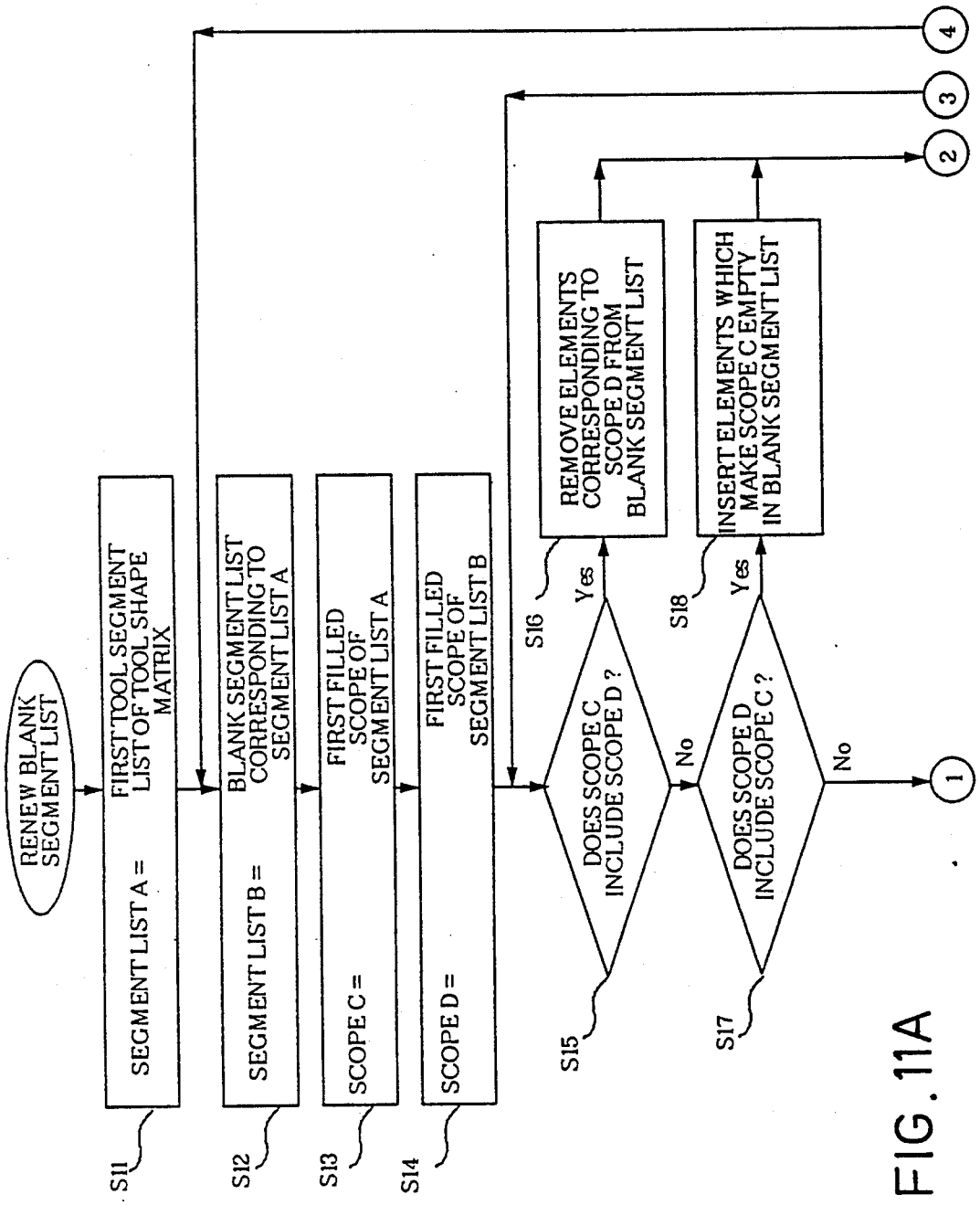
FIGS. 11A and 11B are flowcharts of an example of the renewal of the blank segment list according to the machining simulation method of this invention.
Figure 11B:
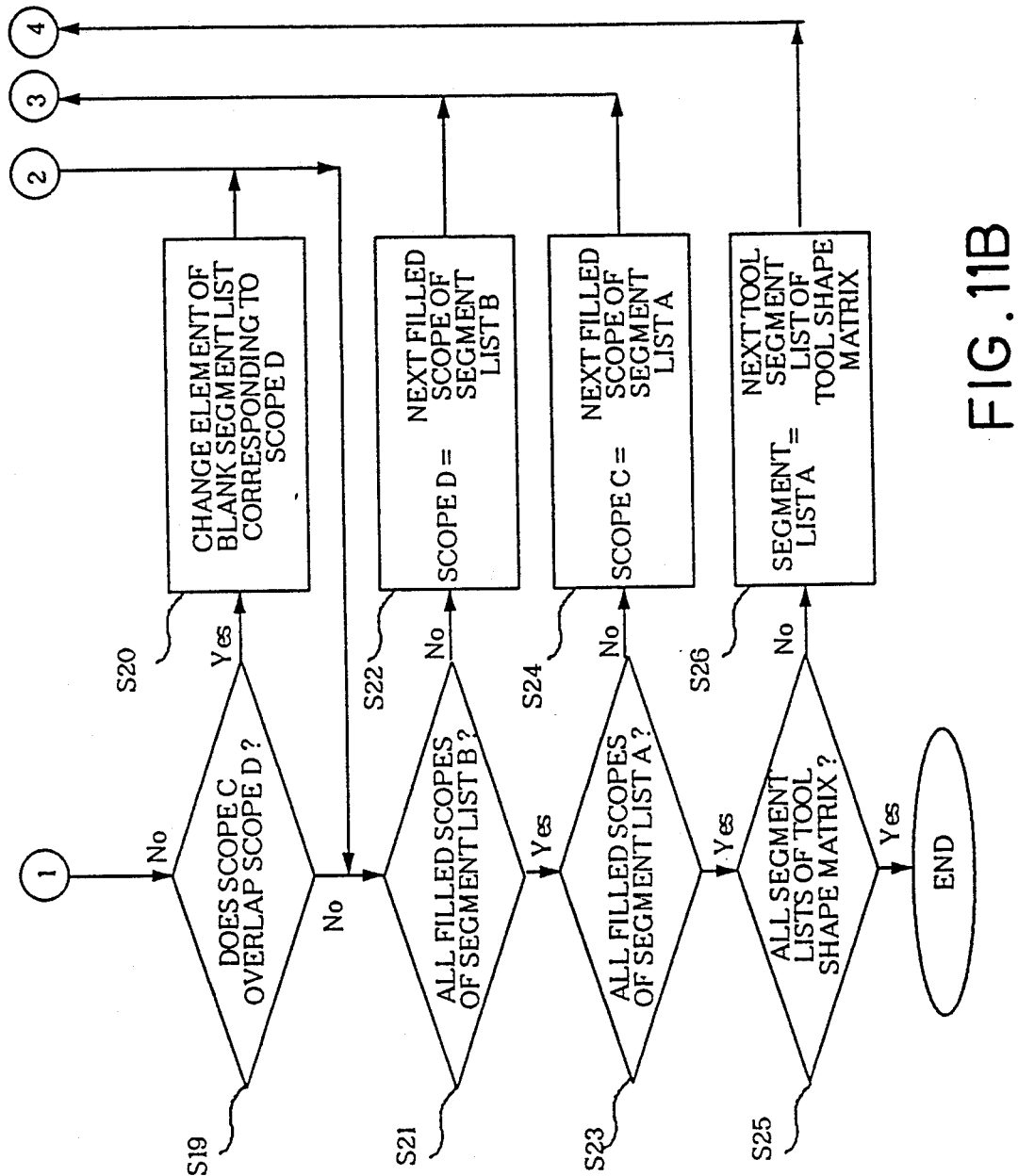

FIG. 10 and FIGS. 11A and 11B are flowcharts of the simulation method which is realized by the simulation system shown in FIG. 9. The blank data and the tool data are inputted from the keyboard 58 and the memory medium 57 respectively (Step S1). Based on the input blank data, the processor 51 prepares a blank shape matrix and a blank segment list (Step S2). Similarly, based on the input tool data, the processor 51 prepares a tool shape matrix and a tool segment list (Step S3). The prepared blank segment list is stored in the blank segment list memory 52 memory 52 while the tool segment list is stored in the tool segment list memory 53. The blank segment list is renewed based on the tool segment list (Step S4). Based on the tool shape matrix and the blank shape matrix prepared in the above Steps S2 and S3, an image is displayed on the screen of the display unit 55 via the display controller 54 (Step S5). FIGS. 8A through 8D show images of resultant display made by the Step S5. FIG. 8E shows the same state as the one shown in FIG. 8B, but since the segment 6 has had its blank segment list renewed by the Step S4, the display is separately made to show the part which is being cut. Then, a determination is made as to whether or not the simulation has been completed and if it has not, the sequence advances to the Step S7 (Step S6). As the tool 4 moves, the tool shape matrix and the tool segment list are renewed and the sequence is returned to the Step S4 (Step S7).

FIGS. 11A and 11B are flowcharts which describe in detail the renewal of the blank segment list of the Step S4. The structural type variable (segment list A) is replaced by the first tool segment list of the tool shape matrix (Step S11), and the structural type variable (segment list B) is replaced by the blank segment list corresponding to the first tool segment list of the tool shape matrix (=segment list A) (Step S12). Then, the structural type variable (Scope C) is replaced by the first filled scope of the segment list A (Step S13) and the structural type variable (Scope D) is replaced by the first filled scope of the segment list B (Step S14). If the scope C includes the scope D, or if the tool 4 is to cut off all of the part of the scope D of the blank 1, the procedure advances to the Step S16, and if not, it goes to the Step S17 (Step S15). The Step S16 removes the elements corresponding to the scope D from the blank segment list. If all the elements of the blank segment list are eliminated, the segment of the list corresponding thereto becomes empty "∞". If the element of the tool segment list corresponding to the scope C is not the cutting blade, there is an indication that the occurrence of tool interference means that the element has been cut with a part of the tool which is not the blade. If the scope D includes the scope C, or the tool 4 is cutting the part of the blank in the scope C, the procedure advances to the Step S18 but if not, it goes to the Step S19 (Step S17). As an empty scope C is produced in the filled scope D of the blank 1, an element which makes the scope C empty is inserted into the elements corresponding to the scope D of the blank segment list (Step S18). If either one of the elements of the tool segment list corresponding to the scope C is a part other than the cutting blade, there is an indication that the occurrence of the tool interference means that the part is being cut with the part of the tool 4 which is not the cutting blade. If the scope C overlaps the scope D, the procedure goes to the Step S20, but if not, it goes to the Step S21 (Step S19). As the filled scope D of the blank 1 is partially cut off by the filled scope C of the tool 4, the value of the element of the blank segment list corresponding to the scope D is changed to eliminate the overlap between the scopes C and D (Step S20). At this time, if the element in the scope D out of the elements of the tool segment list corresponding to the scope C is not the cutting blade, there is an indication that the occurrence of the tool interference means that the part has been cut with the part of the tool which is not the cutting blade. In the Steps S21 through S24, the processing of the Steps S15 through S20 are repeated for all the filled scopes of the tool and all the filled scopes of the blank. In the Steps S25 and S26, the processing of the Steps S12 through S20 are conducted for all the segment lists of the tool shape matrix.

Although the flowchart in FIGS. 11A and 11B illustrate that all the processings are conducted by one processor, the procedure for each segment list may be separately conducted, and therefore plural processors may be used to process the segment lists of the tool shape matrix respectively.

As stated in the foregoing, this invention can reduce the capacity of the memories required to express three dimensional shapes by expressing a blank and a tool which are present in the coordinates of the cubic space simply in terms of distance from the viewing plane alone, and can reduce the amount of processings by the processor remarkably by using the same data format of the cubic shapes for the screen display as well as for the blank shape change processing. As the processings are independent and separate for each segment, they may be conducted by a multi-processor system.

It should be understood that many modifications and adaptations of the invention will become apparent to those skilled in the art and it is intended to encompass such obvious modifications and changes in the scope of the claims appended hereto.

What is claimed is:

1. A machining simulation method for displaying in animation the states of machining a blank by a tool, which comprises the steps of: segmenting a viewing plane on which a blank shape is projected into segments of a given size; preparing a blank shape matrix which stores for each of said segments the distances between visible surfaces of said blank and said viewing plane in terms of many-values and a tool shape matrix which stores the distances between the visible surfaces of said tool and said viewing plane for each of said segments in terms of many-values; forming a blank segment list of each of the segments for the invisible surfaces of said blank hidden by said visible surfaces by using the distances from said viewing plane as elements and using said blank shape matrix as the top or the first element so as to identify whether said blank fills the space between the elements of said blank segment list; forming a tool segment list of each of the segments for the invisible surfaces of said tool hidden by said visible surfaces by using the distances from said viewing plane as elements and using said tool shape matrix as the top or first element so as to identify whether said tool fills the space between the elements of said tool segment list; revising said blank segment list so as to make the scope in which said blank segment list and said tool segment list of the same segment overlap empty, revising said blank segment list by changing the distances from said viewing plane stored by each element of said tool segment list and changing the correspondence in each segment between said blank segment list and said tool segment list, and repeating the stops of revising the blank segment list, thereby revising a displayed shape of a blank being machined after each simulated machining pass of the tool.

2. A machining simulation method as claimed in claim 1, further including the step of displaying the relative magnitude of said distances and presence/absence of overlaps of the filled spaces between said blank segment list and said tool segment list for each segment of said blank shape matrix and said tool shape matrix.

3. A machining simulation method as claimed in claim 1, wherein the cutting blade can be distinguished from other parts of the tool for each element of said tool segment list, and if the element of said non-blade portion is included in the filled space of said blank segment list, an indication that an occurrence of tool interference is effected for the scope where the filled portions of said blank segment list and said tool segment list corresponding to said each segment overlap.

* * * * *